United States Patent [19]

Groebke

[11] 4,038,269
[45] July 26, 1977

[54] 2'-ALKOXYACYLAMINO-4'-ALKYLAMINO-4-NITRO-1,1'-AZOBENZENE DISPERSE DYES

[75] Inventor: Wolfgang Groebke, Oberwil, Switzerland

[73] Assignee: Sandoz Ltd., Basel, Switzerland

[21] Appl. No.: 646,244

[22] Filed: Jan. 2, 1976

Related U.S. Application Data

[63] Continuation of Ser. No. 410,479, Oct. 29, 1973, abandoned, which is a continuation-in-part of Ser. No. 138,760, April 29, 1971, abandoned.

[30] Foreign Application Priority Data

| May 6, 1970 | Switzerland | 6808/70 |
| Dec. 29, 1970 | Switzerland | 19249/70 |
| May 16, 1973 | Switzerland | 6908/73 |

[51] Int. Cl.² .................. C09B 29/08; C09B 29/26
[52] U.S. Cl. .................. 260/207; 260/205; 260/206; 260/207.1; 260/207.5
[58] Field of Search .......... 260/205, 206, 207, 207.1, 260/207.5

[56] References Cited

U.S. PATENT DOCUMENTS

| 3,268,507 | 8/1966 | Kruckenberg | 260/207 |
| 3,342,804 | 9/1967 | Mueller | 260/207.1 |
| 3,359,256 | 12/1967 | Mueller et al. | 260/205 |
| 3,398,135 | 8/1968 | Mueller | 260/205 |
| 3,522,235 | 7/1970 | Baron et al. | 260/207 |
| 3,544,550 | 12/1970 | Anderton et al. | 260/207.1 |
| 3,621,009 | 11/1971 | Ono et al. | 260/207 |
| 3,637,651 | 1/1972 | Baron et al. | 260/207 |
| 3,692,769 | 9/1972 | Weaver et al. | 260/207.1 |
| 3,775,049 | 11/1973 | Wolfrum et al. | 260/207.1 X |

FOREIGN PATENT DOCUMENTS

| 1,539,436 | 8/1968 | France | 260/205 |
| 1,928,372 | 2/1970 | Germany | 260/207.1 |
| 2,120,876 | 11/1971 | Germany | 260/207 |
| 1,946,459 | 9/1970 | Germany | 260/207 |

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

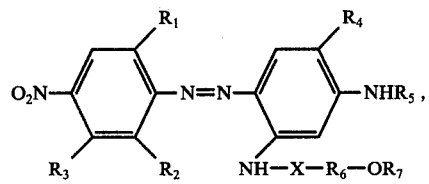

wherein
$R_1$ is chloro, bromo, cyano, nitro, alkylsulphonyl, substituted alkylsulphonyl, phenylsulphonyl or substituted phenylsulphonyl,
$R_2$ is hydrogen, chloro, bromo or cyano,
$R_3$ is hydrogen, chloro, bromo or acylamino, with the proviso that at least one of $R_2$ and $R_3$ is hydrogen,
$R_4$ is hydrogen, alkyl, substituted alkyl, alkoxy or substituted alkoxy,
$R_5$ is alkyl or substituted alkyl,
$R_6$ is alkylene or 1 to 4 carbon atoms,
$R_7$ is alkyl of substituted alkyl, and
X is —CO—, —$CO_2$— or —$SO_2$—.

These dyes are suitable for application as disperse dyes and as such are employed for dyeing high molecular weight synthetic and regenerated organic fibers in loose form, as yarn and in the various textile forms. The dyes are of high tinctorial strength, have good affinity and are resistant to sublimation; they give dyeings of notably good light and wet fastness.

18 Claims, No Drawings

2'-ALKOXYACYLAMINO-4'-ALKYLAMINO-4-NITRO-1,1'-AZOBENZENE DISPERSE DYES

This application is a continuation of application Ser. No. 410,479, filed Oct. 29, 1973 and now abandoned, which is a continuation-in-part of application Ser. No. 138,760, filed Apr. 29, 1971 and now abandoned.

This invention relates to compounds of the 4-nitro-2'-alkoxyacylamino-4'-monoalkylamino-1,1'-azobenzene series which are free from sulphonic acid groups. They are highly suitable for application as disperse dyes and as such are employed for dyeing high molecular weight synthetic and regenerated organic fibres in loose form, as yarn and in the various textile forms. The dyes are of high tinctorial strength, have good affinity and are resistant to sublimation; they give dyeings of notably good light and wet fastness.

These new dyes have the formula

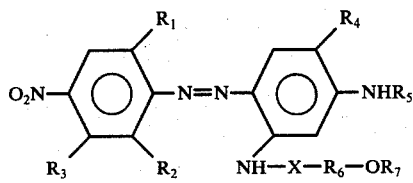

(I), where
$R_1$ is chlorine, bromine, cyano, nitro or unsubstituted or substituted alkylsulphonyl or phenylsulphonyl,
$R_2$ is hydrogen, chlorine, bromine or cyano,
$R_3$ is hydrogen, chlorine, bromine or acylamino, with the proviso that at least one of $R_2$ and $R_3$ is hydrogen,
$R_4$ is hydrogen or unsubstituted or substituted alkyl or alkoxy,
$R_5$ is alkyl which may be substituted by chlorine, bromine, cyano, hydroxyl, alkoxy, chloroalkoxy, bromoalkoxy or cyanoalkoxy, or by alkylcarbonyloxy, benzoyloxy, alkoxycarbonyl, phenoxycarbonyl, alkoxycarbonyloxy or phenoxycarbonyloxy which may bear substituents,
$R_6$ is an alkylene radical having 1, 2, 3 or 4 carbon atoms,
$R_7$ is alkyl which may bear substitutents, and
X is a group of the formula —CO—, —COO—, or —SO$_2$—
and where the molecule is free from sulphonic acid groups.

Preferred dyes of formula I are those where X is —COO—.

All the aforenamed alkyl, alkylene and alkoxy groups contain on the average 1 to 4 carbon atoms. The preferred substituents on the alkyl and alkoxy groups include halogen atoms, notably chlorine and bromine atoms, hydroxyl and cyano groups.

The named phenyl radicals, including the phenyl nucleus of the benzoyl radical, may bear substituents such as chlorine, bromine, cyano, nitro, acyl, alkyl and alkoxy.

The preferred acyl groups are of the formula R—Y— or R'—Z—,
where
R is a hydrocarbon radical which may bear the aforenamed substituents and/or may contain hetero atoms, preferably an alkyl or phenyl radical,
Y is —O—CO— or —SO$_2$—,
R' is hydrogen or R,
Z is —CO—, —NR"—CO— or —NR"SO$_2$—
and
R" is hydrogen or R.

The compounds of formula I are produced by the diazotization of an amine of the formula

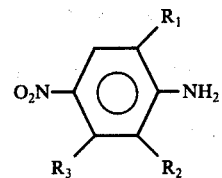

(II), and coupling of the resulting diazonium compound with a compound of the formula

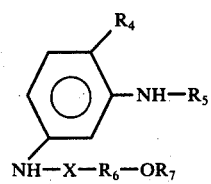

(III).

The coupling components of formula (III) are produced by known methods, e.g. by reaction of an amine of the formula

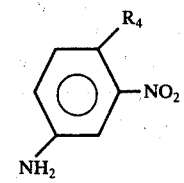

with an acid of the formula HOOC(CH$_2$)$_n$—O—R$_7$ at temperatures in the range of about 150° C to 200° C with cleavage of water, followed by reduction of the nitro group and introduction of the radical R$_5$ by condensation or addition.

The preferred compounds of the formula (I) are of formula

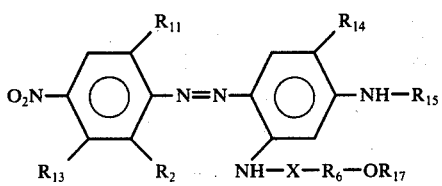

(IV), where
$R_2$ is hydrogen, chlorine, bromine or cyano, and
$R_6$ is an alkylene radical containing 1, 2, 3 or 4 carbon atoms,
$R_{11}$ is chlorine, bromine, cyano, nitro, methylsulphonyl, phenylsulphonyl or tolylsulphonyl,
$R_{13}$ is hydrogen, chlorine, bromine or alkylcarbonylamino which has 1 or 2 carbon atoms in the alkyl radical and may bear chlorine or bromine as substituents, where at least one of $R_2$ and $R_{13}$ is hydrogen, $R_{14}$ is hydrogen, methoxy or ethoxy, $R_{15}$ is alkyl having 1 to 4 carbon atoms which may bear as substituents hydroxyl, cyano, methoxy, ethoxy, acetoxy, propionyloxy, butyryloxy, benzoyloxy, methoxycarbonyl, ethoxycarbonyl, propyloxycarbonyl, methoxycarbonyloxy or ethoxycarbonyloxy, $R_{17}$ is methyl, ethyl or propyl, especially those wherein X is a group of the formula —COO—.

More preferred are the compounds of the formula

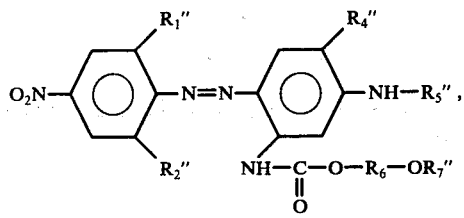

wherein $R_1''$ is cyano, nitro, methylsulfonyl, phenylsulfonyl or tolylsulfonyl, $R_2''$ is chloro, bromo or cyano, $R_4''$ is hydrogen, methoxy or ethoxy, $R_5''$ is alkyl of 1 to 4 carbon atoms or alkyl of 1 to 4 carbon atoms substituted by hydroxy, cyano, methoxy, ethoxy, acetoxy, propionyloxy, butyryloxy, benzoyloxy, methoxycarbonyl, ethoxycarbonyl, propoxycarbonyl, butoxycarbonyl, methoxycarbonyloxy or ethoxycarbonyloxy, $R_6$ is alkylene of 1 to 4 carbon atoms, and $R_7''$ is methyl, ethyl or propyl.

Still more preferred are the compounds of the foregoing group wherein $R_1''$ is cyano or nitro, $R_5''$ is substituted ethyl wherein the substituent is methoxycarbonyl, ethoxycarbonyl, propoxycarbonyl, butoxycarbonyl or cyano, and $R_6$ is alkylene of 1, 2 or 3 carbon atoms, particularly alkylene of 2 or 3 carbon atoms, and more particularly ethylene, and particularly those of the formula

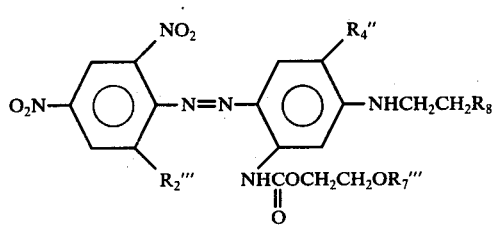

wherein $R_2'''$ is bromo or cyano, $R_4''$ is hydrogen, methoxy or ethoxy, $R_7'''$ is methyl or ethyl, and $R_8$ is cyano, methoxycarbonyl or ethoxycarbonyl.

These compounds also can be produced by diazotization of an amine of the formula (V)

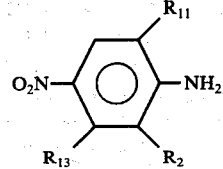

and coupling with a compound of the formula (VI)

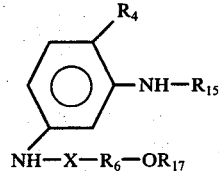

The diazotizing and coupling reactions are carried out according to standard methods which have been known for over a century.

The new compounds of formula (I) are worked up as dyeing preparations by the known methods, for example by grinding in the presence of dispersing agents and/or fillers. The ground mixtures are vacuum or injection dried if dry preparations are desired. The preparations are added to a suitable volume of water for exhaust dyeing, pad dyeing or printing at long or short liquor ratio.

From aqueous dispersion the dyes build up powerfully on synthetic and regenerated organic fibres, both in the loose form and as yarn or textiles. They are especially suitable for dyeing and printing polyester, cellulose acetate, cellulose triacetate and polyamide fibres and textiles, and can also be applied to polyolefin fibres. The known dyeing and printing methods are employed, for instance the process described in French Pat. No. 1,445,371.

The dyeings obtained have good fastness in a comprehensive range of properties, the fastness to light and thermofixation, sublimation and pleating being notably good. They are very fast to wet treatments such as washing, water, sea water, perspiration, solvents, especially dry cleaning liquors, lubricants, and to rubbing, cross dyeing, ozone, gas fumes and chlorine. The dyeings are stable to pre-cure and post-cure permanent press finishing and to soil release finishes. They show good stability to reducing action in the dyeing of textiles containing wool and reserve wool and cotton. The dyeings are dischargeable.

In the following Examples the parts and percentages are by weight and the temperatures in degrees centigrade.

EXAMPLE 1

At 70° 7 parts of sodium nitrite are added to 155 parts of concentrated sulphuric acid, followed at 20° by 100 parts of glacial acetic acid and 26,2 parts of 2-bromo-4,6-dinitroaminobenzene. After stirring for 2 hours at 10°–20° the diazonium salt solution is combined with a solution of 80 parts of glacial acetic acid, 3 parts of urea and 29.1 parts of 1-(3'-methoxypropionyl)-amino-4-ethoxy-3-N-β-cyanoethylaminobenzene. The pH is adjusted to 3–4 with 30% sodium acetate solution, upon which the dye settles out. It is filtered, washed with water until free of acid and salt, and dried. It dyes polyester fibres in blue shades of good fastness.

Further dyes of formula (I) which can be produced in analogy with the preceding Example are specified in the Table 1 below.

Table 1

| Ex. No. | R₁ | R₂ | R₃ | R₄ | R₅ | R₆ | R₇ | X | Shade on polyester fibre |
|---|---|---|---|---|---|---|---|---|---|
| 2 | —NO₂ | Cl | H | —OC₂H₅ | —CH₂CN | | —CH(CH₃)₂ | —CO— | blue |
| 3 | Cl | H | H | H | " | | —CH₃ | " | red |
| 4 | —SO₂CH₃ | H | H | H | " | | " | " | " |
| 5 | —NO₂ | Cl | H | —OC₂H₅ | " | | " | " | blue |
| 6 | " | Br | H | " | " | | " | " | " |
| 7 | Cl | Cl | H | H | " | | " | " | " |
| 8 | " | " | H | H | " | | " | " | " |
| 9 | Cl | H | H | H | " | | " | " | red |
| 10 | —CN | H | H | H | " | | " | " | violet |
| 11 | —NO₂ | Cl | H | —OC₂H₅ | " | | " | " | blue |
| 12 | " | Br | H | " | " | | " | " | " |
| 13 | Cl | Br | H | H | " | | " | " | " |
| 14 | —NO₂ | Br | H | H | " | | " | " | " |
| 15 | " | Br | H | H | " | | " | " | brown |
| 16 | Cl | Br | H | H | " | | " | " | blue |
| 17 | " | Br | H | —OC₂H₅ | —CH₂CH₂COOCH₃ | —CH₃ | " | " | " |
| 18 | —CN | Br | H | H | —CH₂CH₂COOC₂H₅ | " | " | " | brown |
| 19 | " | Br | H | H | —CH₂CH₂COOCH(CH₃)₂ | " | " | " | blue |
| 20 | —NO₂ | Br | H | —OC₂H₅ | —CH₂CH₂COOC₂H₅ | " | " | " | " |
| 21 | " | Br | H | H | " | —CH₂CH₂CH₂— | " | " | reddish blue |
| 22 | Cl | Cl | H | H | " | " | —C₂H₅ | " | " |
| 23 | —CN | Cl | H | H | —CH₂CH₂COOC₂H₅ | " | " | —CO— | " |
| 24 | " | H | H | H | —CH₂CN | | " | " | reddish violet |
| 25 | " | —CN | H | H | " | —CH₂CH₂— | " | " | blue |
| 26 | " | " | H | H | —CH₂CH₂CN | " | " | " | reddish |
| 27 | " | Cl | H | H | —CH₂CH₂COOC₂H₅ | —CH₃ | —CH₃ | " | violet |
| 28 | —NO₂ | Br | H | H | —CH₂CH₂OCOCH₃ | " | —C₂H₅ | " | blue |
| 29 | " | Br | H | H | —CH₂CH₂COOC₂H₅ | —CH₂— | " | " | reddish |
| 30 | " | Br | H | H | —CH₃ | | —CH₃ | " | violet |
| 31 | " | Br | H | H | —CH₂CH₂COOC₂H₅ | —CH₂CH₂— | " | " | red |
| 32 | Cl | Cl | H | H | —CH₂CH₂COOCH₃ | " | —CH(CH₃)₂ | " | reddish |
| 33 | —CN | Br | H | H | —CH₂CH₂OCOCH₃ | " | " | " | brown |
| 34 | —SO₂CH₃ | Cl | H | H | —CH₂CH₂COOC₂H₅ | " | " | " | brown |
| 35 | Cl | H | H | H | —CH₂CH₂OCOC₆H₅ | " | " | " | blue |
| 36 | Br | H | H | H | —C₂H₅ | " | " | " | " |
| 37 | —CN | H | H | H | " | —CH₂CH₂— | " | " | violet |
| 38 | —SO₂CH₃ | —CN | H | H | " | " | " | " | " |
| 39 | " | H | H | H | " | " | " | " | violet |
| 40 | —SO₂C₆H₅ | H | H | H | " | " | " | —COO— | blue |
| 41 | " | H | H | H | " | " | —CH₃ | —SO₂— | reddish blue |
| 42 | ![p-tolyl-SO₂-C₆H₄-CH₃] | H | H | H | " | " | " | —CO— | " |
| 43 | —NO₂ | H | Cl | —OC₂H₅ | —CH₂CH₂COOC₂H₅ | | —C₂H₅ | " | blue |
| 44 | " | H | Br | " | " | | " | " | violet |
| 45 | " | H | —NHCOCH₃ | " | " | | " | " | " |
| 46 | " | H | —NHCOC₂H₅ | " | " | | " | " | blue |
| 47 | " | H | —NHCOCH₂Cl | —OC₂H₅ | " | | " | " | " |

Table 1-continued

| Ex. No. | $R_1$ | $R_2$ | $R_3$ | $R_4$ | $R_5$ | $R_6$ | $R_7$ | X | Shade on polyester fibre |
|---|---|---|---|---|---|---|---|---|---|
| 48 | " | H | —NHCOCH$_2$CH$_2$Br | H | —CH$_2$CH$_2$OH | " | " | " | violet |
| 49 | " | Cl | H | —OCH$_3$ | —CH$_2$CH$_2$OCOCH$_3$ | " | " | " | blue |
| 50 | " | Cl | H | " | —CH$_2$CH$_2$OCOC$_2$H$_5$ | " | " | " | " |
| 51 | " | Cl | H | H | —CH$_2$CH$_2$OCOC$_2$H$_5$ | " | " | " | " |
| 52 | H | Cl | H | H | —CH$_2$CH$_2$OCOC$_3$H$_7$ | " | " | " | red |
| 53 | H | —CN | H | H | —CH$_2$CH$_2$OCOC$_2$H$_5$ | " | —CH$_3$ | " | violet |
| 54 | —SO$_2$—⟨○⟩—CH$_3$ | Cl | H | —OC$_2$H$_5$ | —CH$_2$CH$_2$COOC$_2$H$_5$ | " | —C$_2$H$_5$ | " | blue |
| 55 | —SO$_2$CH$_3$ | Cl | H | H | —CH$_2$CH$_2$CN | " | " | " | " |
| 56 | " | Cl | H | " | " | " | —CH$_3$ | " | " |
| 57 | " | Cl | H | " | —CH$_2$CH$_2$COOC$_2$H$_5$ | " | " | " | " |
| 58 | " | —CN | H | H | " | " | " | " | " |

EXAMPLE 59

6.9 Parts of sodium nitrite are slowly added, with stirring, to 140 parts of concentrated sulphuric acid at 60° to 70°. The mixture is stirred for a further 10 minutes at 60°, cooled to 5°-10° and 26.2 parts 2,4-dinitro-6-bromoaniline is added. Diazotization is completed after three hours. The resulting diazonium salt solution is added, with stirring, to a mixture of 35.4 parts of the compound of the formula

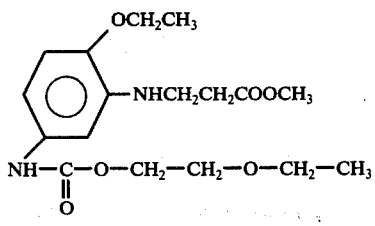

200 parts of glacial acetic acid, 2 parts of aminosulphonic acid and 200 parts of ice. 30% Sodium acetate solution is added to give a pH of from 2 to 3, whereupon the dyestuff settles out. It is suction filtered, washed free of acid and salts with water, and dried. The resulting dyestuff dyes polyester fibres in blue shades of good fastness and depth of colour.

EXAMPLE 60

26.2 Parts of 2,4-dinitro-6-bromoaniline is diazotized as described in Example 59. The resulting diazonium salt solution is added, with stirring, to a mixture of 32.1 parts of the compound of the formula

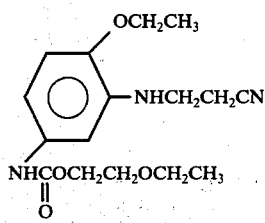

200 parts of glacial acetic acid, 2 parts of aminosulphonic acid and 200 parts of ice. The coupling is carried out in acid medium, with addition of sodium acetate to adjust the pH to 2.0 to 2.5. The dyestuff forms quickly and settles out. It is suction filtered, washed free of acid and salts with water and dried. The resulting dyestuff dyes synthetic fibres in blue shades with excellent fastness.

The dyes of the following Tables 2-6 may be prepared in analogous manner to that described in Example 59 or 60.

Further dyes of formula I which may be produced in analogy with the procedure of Example 59 or 60 are shown in the following Table 2. They correspond to the formula

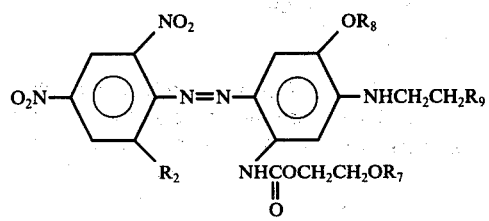

Table 2

| Ex. No. | $R_2$ | $R_7$ | $R_8$ | $R_9$ | Shade on Polyester |
|---|---|---|---|---|---|
| 61 | Cl | —$CH_3$ | —$CH_2CH_3$ | —$COOCH_3$ | blue |
| 62 | Cl | —$CH_2CH_3$ | " | " | " |
| 63 | Cl | " | —$CH_3$ | " | " |
| 64 | Cl | " | —$CH_2CH_3$ | —CN | " |
| 65 | Cl | —$CH_3$ | —$CH_3$ | —$COOCH_3$ | " |
| 66 | Cl | —$CH_2CH_3$ | —$CH_2CH_3$ | —$COOCH_2CH_3$ | " |
| 67 | Br | " | " | " | " |
| 68 | —CN | " | " | " | " |
| 69 | —CN | " | " | —$COOCH_3$ | " |
| 70 | —CN | —$CH_3$ | " | " | " |
| 71 | —CN | " | —$CH_3$ | " | " |
| 72 | —CN | —$CH_2CH_3$ | " | —$COOCH_2CH_3$ | " |
| 73 | Br | " | " | " | " |
| 74 | Br | " | —$CH_2CH_3$ | —$COOCH_2CH_2CH_3$ | " |
| 75 | Br | —$CH_3$ | —$CH_3$ | —$COOCH(CH_3)_2$ | " |
| 76 | Cl | " | " | $COOC_4H_9$-n | " |
| 77 | Br | " | " | " | " |
| 78 | Br | —$CH_2CH_3$ | " | " | " |
| 79 | Br | " | —$CH_2CH_3$ | " | " |
| 80 | —CN | " | " | " | " |
| 81 | —CN | " | —$CH_3$ | " | " |
| 82 | —CN | " | " | —CN | " |
| 83 | —CN | " | —$CH_2CH_3$ | " | " |
| 84 | —Br | —$CH_3$ | " | —$COOCH_2CH(CH_3)_2$ | " |
| 85 | —Br | " | " | —$COOCH_2CH_2OCH_2CH_3$ | " |
| 86 | —Br | —$CH_2CH_2CH_3$ | —$CH_3$ | —$COOCH_3$ | " |
| 87 | —Br | —$CH_2CH_2CH_2CH_3$ | " | " | " |
| 88 | —Br | —$CH(CH_3)_2$ | " | " | " |

Further dyes of formula I which may be produced in accordance with the procedure of Example 59 or 60 are shown in Table 3 below.

The dyes correspond to the formula

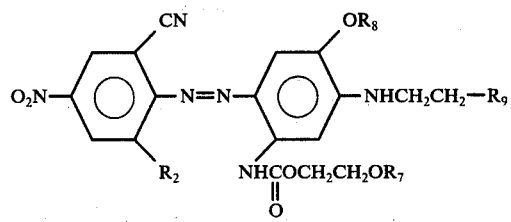

Table 3

| Ex. No. | $R_2$ | $R_7$ | $R_8$ | $R_9$ | Shade on Polyester |
|---|---|---|---|---|---|
| 89 | Cl | —CH$_2$CH$_3$ | —CH$_2$CH$_3$ | —COOCH$_2$CH$_3$ | blue |
| 90 | Br | " | COOCH$_3$ | " | " |
| 91 | Br | " | —CH$_3$ | " | " |
| 92 | —CN | " | " | " | " |
| 93 | —CN | " | " | —COOCH$_2$CH$_3$ | " |
| 94 | —CN | " | —CH$_2$CH$_3$ | —COOCH$_2$CH$_2$CH$_2$CH$_3$ | " |
| 95 | —CN | —CH$_3$ | " | " | " |
| 96 | Br | " | " | " | " |
| 97 | Br | —CH$_2$CH$_3$ | " | " | " |
| 98 | Br | " | " | —CN | " |
| 99 | Br | " | —CH$_3$ | " | " |
| 100 | Cl | " | " | " | " |
| 101 | —CN | " | " | " | " |
| 102 | —CN | " | —CH$_2$CH$_3$ | " | " |
| 103 | —CN | " | " | —COOCH(CH$_3$)$_2$ | " |
| 104 | —CN | —CH$_2$CH$_2$CH$_3$ | " | —COOCH$_3$ | " |
| 105 | —CN | —CH(CH$_3$)$_2$ | " | " | " |
| 106 | —CN | —CH$_2$CH(CH$_3$)$_2$ | " | " | " |

Still further dyes of formula I, which may be produced in accordance with the procedure of Example 59 or 60 are shown in Table 4 correspond to the formula

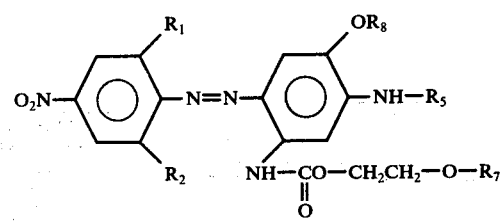

procedure of Example 59 or 60 and correspond to the formula

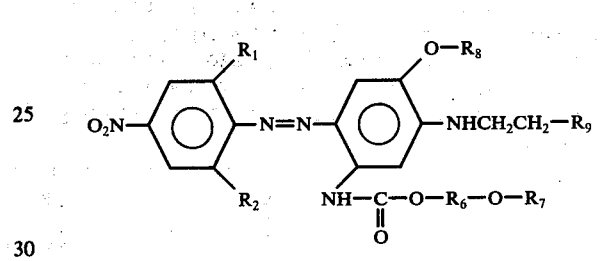

Table 4

| Ex. No. | $R_1$ | $R_2$ | $R_5$ | $R_7$ | $R_8$ | Shade on Polyester |
|---|---|---|---|---|---|---|
| 107 | —NO$_2$ | Br | —CH(CH$_3$)—CH$_2$—CN | CH$_2$CH$_3$ | —CH$_3$ | blue |
| 108 | —NO$_2$ | —CN | " | " | " | " |
| 109 | —SO$_2$CH$_3$ | —Cl | —CH$_2$CH$_2$COOCH$_2$CH$_3$ | " | —CH$_2$CH$_3$ | reddish blue |
| 110 | —SO$_2$—C$_6$H$_5$ | —CN | " | " | " | blue |
| 111 | —SO$_2$CH$_3$ | —CN | " | " | " | " |
| 112 | " | —CN | —CH$_2$CH$_2$CN | " | " | " |
| 113 | —SO$_2$CH$_2$CH$_3$ | " | " | —CH$_3$ | —CH$_3$ | " |
| 114 | " | " | —CH$_2$CH$_2$COOCH$_2$CH$_2$CH$_2$CH$_3$ | " | " | " |
| 115 | —SO$_2$—⟨C$_6$H$_4$⟩—CH$_3$ | " | " | " | " | " |
| 116 | —SO$_2$CH$_3$ | " | —CH$_2$CH$_2$COOCH(CH$_3$)$_2$ | " | " | " |
| 117 | " | " | —CH$_2$CH$_2$COOCH$_2$CH$_3$ | " | " | " |
| 118 | " | " | " | —CH$_2$CH$_3$ | " | " |
| 119 | " | " | —CH$_2$CH$_2$COOCH$_3$ | " | —CH$_2$CH$_3$ | " |
| 120 | " | " | " | " | " | " |
| 121 | " | " | " | —CH$_2$CH$_2$CH$_3$ | —CH$_3$ | " |
| 122 | " | Cl | " | —CH(CH$_3$)$_2$ | " | " |
| 123 | " | —CN | " | —CH$_2$CH$_2$CH$_2$CH$_3$ | " | " |

Table 5

| Ex. No. | $R_1$ | $R_2$ | $R_6$ | $R_7$ | $R_8$ | $R_9$ | Shade on Polyester |
|---|---|---|---|---|---|---|---|
| 124 | —NO$_2$ | Br | —CH$_2$CH$_2$CH$_2$— | —CH$_2$CH$_3$ | —CH$_3$ | —COOCH$_3$ | blue |
| 125 | —NO$_2$ | —CN | " | " | " | —COOCH$_2$CH$_3$ | " |
| 126 | —SO$_2$CH$_3$ | " | " | " | —CH$_2$CH$_3$ | " | " |
| 127 | —NO$_2$ | Cl | " | —CH$_3$ | " | —CN | " |
| 128 | —CN | —CN | " | —CH$_2$CH$_3$ | " | —COOCH$_2$CH$_2$CH$_2$CH$_3$ | " |
| 129 | " | " | " | " | " | —COOCH$_3$ | " |
| 130 | —SO$_2$—⟨C$_6$H$_4$⟩—CH$_3$ | " | " | " | " | —COOCH$_2$CH$_3$ | " |

Further dyes of formula I are shown in the following Table 5, they may be produced in accordance with the Further dyes of formula I are shown in the following Table 6, they may be produced in accordance with the procedure of Example 59 or 60 and correspond to the formula

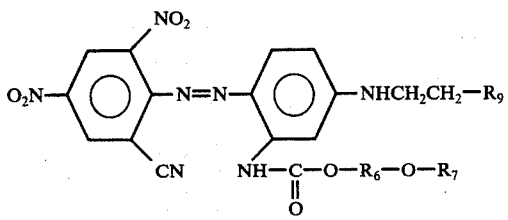

Table 6

| Ex. No. | $R_6$ | $R_7$ | $R_9$ | Shade on Polyester |
|---|---|---|---|---|
| 131 | $-CH_2CH_2-$ | $-CH_3$ | $-COOCH_3$ | blue |
| 132 | " | " | $-COOCH_2CH_3$ | " |
| 133 | " | " | $-COOCH_2CH_2CH_3$ | " |
| 134 | " | " | $-COOCH_2CH_2OCH_2CH_3$ | " |
| 135 | " | " | $-COOCH_2CH(CH_3)_2$ | " |
| 136 | " | $-CH_2CH$ | | " |
| 137 | " | " | $-COOCH_2CH_2OCH_2CH_3$ | " |
| 138 | " | " | $-COOCH_2CH_2CH_2CH_3$ | " |
| 139 | " | " | $-COOCH_2CH_3$ | " |
| 140 | " | " | $-COOCH_3$ | " |
| 141 | " | " | $-CN$ | " |
| 142 | " | $-CH(CH_3)_2$ | $-COOCH_2CH_3$ | " |
| 143 | $-CH_2CH_2CH_2-$ | $-CH_2CH_3$ | " | " |

APPLICATION EXAMPLE A

A mixture of 7 parts of the dye produced as in Example 1, 4 parts of sodium dinaphthylmethane disulphonate, 4 parts of sodium cetyl sulphate and 5 parts of anhydrous sodium sulphate is ground in a ball mill for 48 hours to give a fine powder. One part of the powder is dispersed in a little water and the dispersion run through a sieve into a bath of 4000 parts of water containing 2 parts of sodium lauryl sulphate. At 40°-50° 100 parts of a scoured polyester fabric (goods to liquor ratio 1:40) are entered into the bath. The bath is raised to 40°-50°, 20 parts of an emulsion of a chlorinated benzene in water are added, then it is brought slowly to 100°. The fabric is dyed for 1-2 hours at 95°-100°. On removal it is rinsed, soaped, rinsed again and dried. A level blue dyeing is obtained which has excellent fastness to light, washing, water, sea water, perspiration, sublimation, gas fumes, thermofixation, pleating, cross dyeing and permanent press finishing.

APPLICATION EXAMPLE B

7 Parts of the dye prepared according to Example 61, 4 parts of dinaphthylmethane disulphonate, 4 parts of sodium cetyl sulphate and 5 parts of anhydrous sodium sulphate are ground in a ball mill for 48 hours to give a fine powder. One part of the resulting powder is dispersed with a little water and the dispersion run through a sieve into a bath of 4000 parts of water containing 2 parts of sodium lauryl sulphate. At 40°-50° 100 parts of a scoured polyester fabric (goods to liquor ratio 1:40) are entered into the bath. The bath is raised to 40°-50°, 20 parts of an emulsion of a chlorinated benzene in water are added, then it is brought slowly to 100°. The fabric is dyed for 1-2 hours at 95°-100°. On removal it is rinsed, soaped, rinsed again and dried. A level blue dyeing is obtained which has excellent fastness to light, washing, water, sea water, perspiration, sublimation, gas fumes, thermofixation, pleating, cross dyeing and permanent press finishing.

APPLICATION OF EXAMPLE C

30 Parts of the dye prepared in accordance with Example 59, 40 parts dinaphthylmethane disulphonate, 50 parts of sodium cetyl sulphate and 50 parts of anhydrous sodium sulphate are ground to a fine powder in a ball mill. 100 Parts of a scoured polyester fabric are added to a bath containing 4 parts of the resulting dye preparation in 1000 parts of water which is slowly warmed. The fabric is dyed for 60 minutes under pressure at 130° and a brilliant blue dyeing is obtained, which shows the same fastness as the dyeing of Application Example B, after rinsing, soaping, further rinsing and drying.

APPLICATION EXAMPLE D

20 Parts of the dye obtained according to Example 59, 55 parts of a powder obtained from spent sulphite cellulose liquor and 500 parts water are ground in a ball mill until the dyestuff particles are less than 1 μ.

The resulting colloidal disperse solution is mixed with 25 parts of diethylene glycol monobutyl ether and 400 parts of 6% carboxymethyl cellulose. This printing paste is very suitable for the Vigoureux printing of combed polyester fabric. The print (78% coverage) is achieved with the help of twin rollers, whereupon the fabric is steamed at 120° without intermediate drying. Blue prints with good fastness are obtained.

Formulae of representative dyestuffs of the foregoing Examples are as follows

Example 1

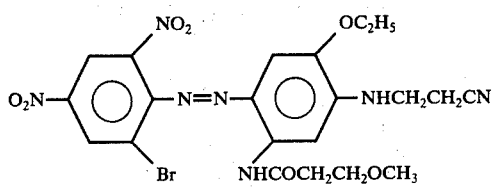

Example 8

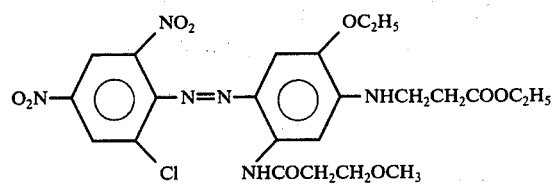

Example 9

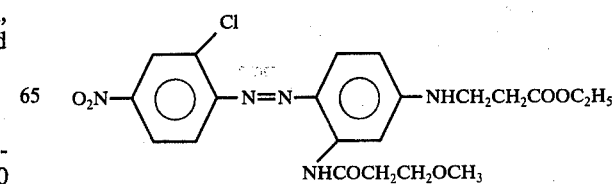

Example 10
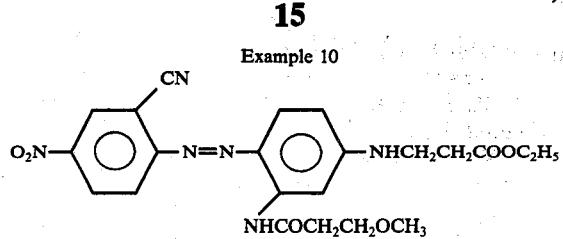

Example 4
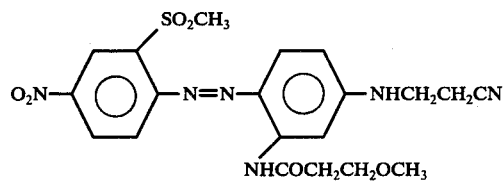

Example 59
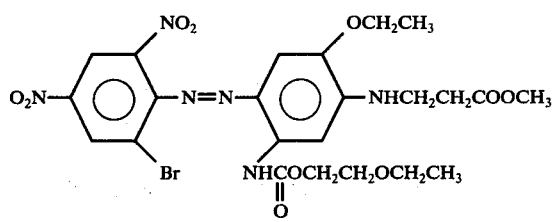

Example 60
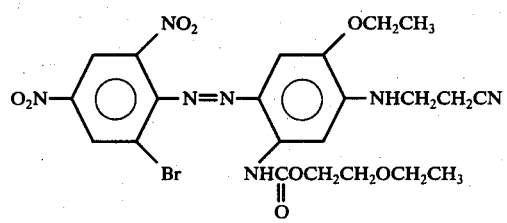

Example 72
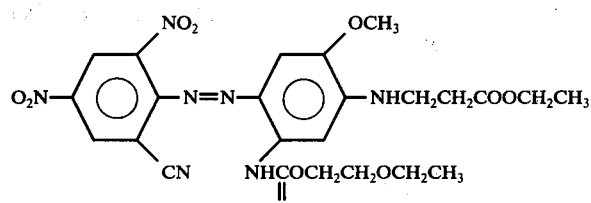

Example 73
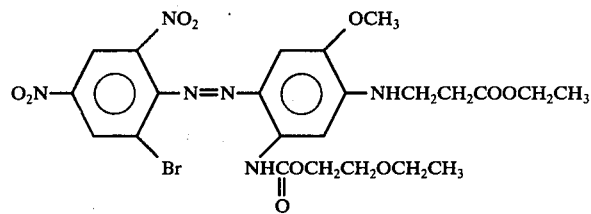

Example 132
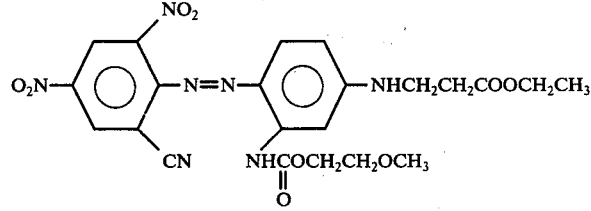

Example 141
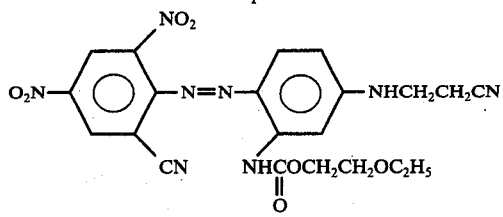

What is claimed is:

1. A compound of the formula

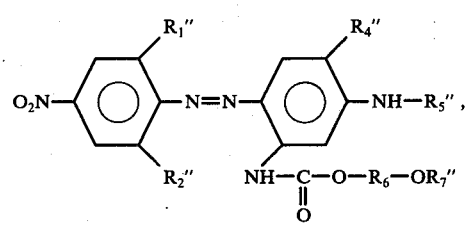

wherein
$R_1''$ is cyano or nitro,
$R_2''$ is chloro, bromo or cyano,
$R_4''$ is hydrogen, methoxy or ethoxy,
$R_5''$ is alkyl of 2 or 3 carbon atoms monosubstituted by cyano or alkoxycarbonyl wherein the alkoxy radical has 1 to 4 atoms,
$R_6$ is alkylene of 2 or 3 carbon atoms, and
$R_7''$ is alkyl of 1 to 4 carbon atoms.

2. A compound according to claim 1 wherein
$R_5''$ is ethyl monosubstituted by cyano or alkoxycarbonyl wherein the alkoxy radical has 1 to 4 carbon atoms.

3. A compound according to claim 2 wherein
$R_7''$ is alkyl of 1 to 3 carbon atoms.

4. A compound according to claim 3 wherein $R_6$ is ethylene.

5. A compound according to claim 4 having the formula

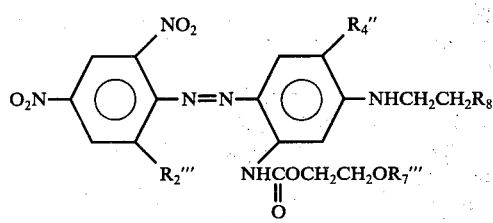

wherein
$R_2'''$ is bromo or cyano,
$R_4''$ is hydrogen, methoxy or ethoxy,
$R_7'''$ is methyl or ethyl, and
$R_8$ is cyano, methoxycarbonyl or ethoxycarbonyl.

6. The compound according to claim 4 having the formula

7. The compound according to claim 4 having the formula

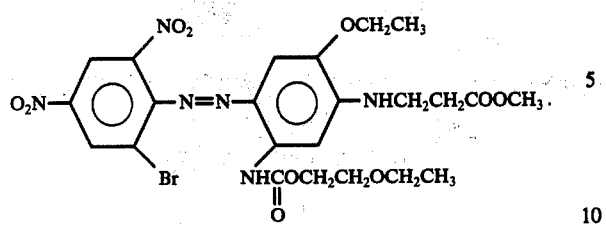

8. The compound according to claim 4 having the formula

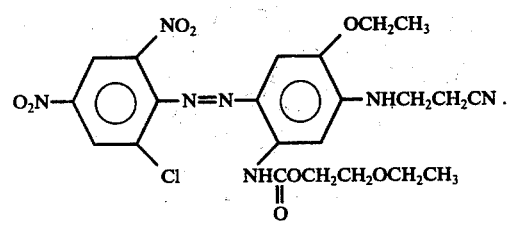

9. The compound according to claim 4 having the formula

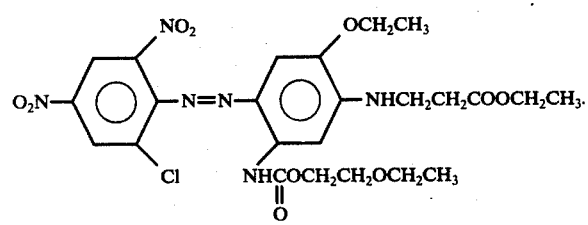

10. The compound according to claim 5 having the formula

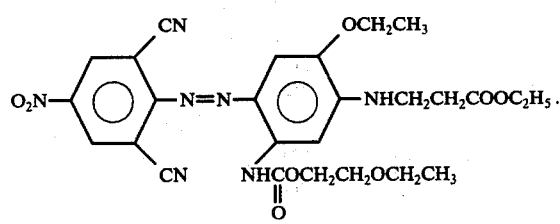

11. The compound according to claim 5 having the formula

12. The compound according to claim 5 having the formula

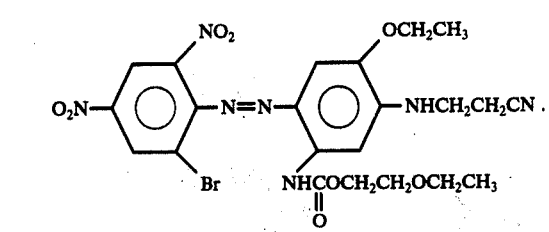

13. The compound according to claim 5 having the formula

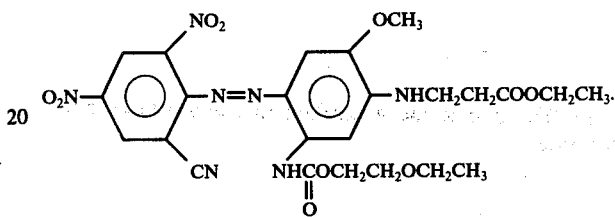

14. The compound according to claim 5 having the formula

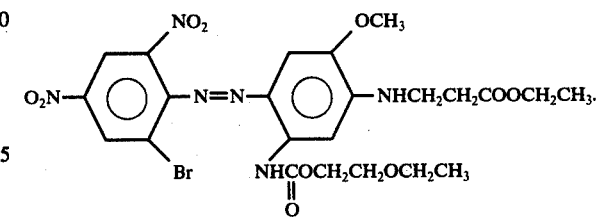

15. The compound according to claim 5 having the formula

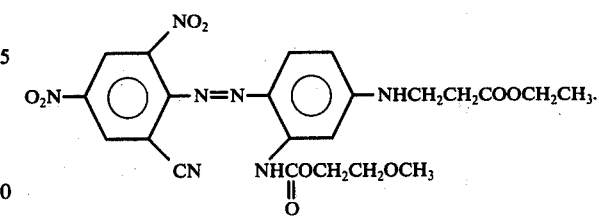

16. The compound according to claim 5 having the formula

17. The compound according to claim 5 having the formula
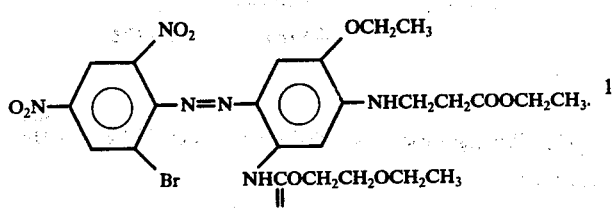
18. The compound according to claim 5 having the formula
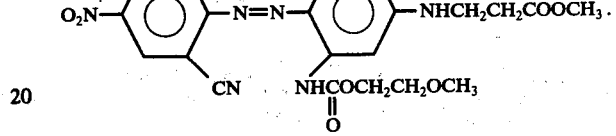
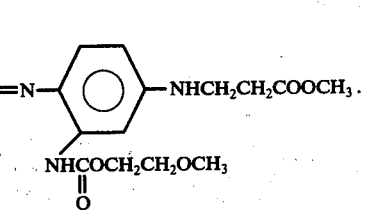
* * * * *